(12) United States Patent
Hu et al.

(10) Patent No.: US 9,225,921 B2
(45) Date of Patent: Dec. 29, 2015

(54) METHOD AND APPARATUS FOR BUFFERING ANALOG INFORMATION

(71) Applicant: ADVANCED MICRO DEVICES, INC., Sunnyvale, CA (US)

(72) Inventors: Joseph Hu, Austin, TX (US); Patrick Lowry, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 196 days.

(21) Appl. No.: 13/911,163

(22) Filed: Jun. 6, 2013

(65) Prior Publication Data

US 2014/0362270 A1    Dec. 11, 2014

(51) Int. Cl.
H04N 3/14 (2006.01)
H04N 5/335 (2011.01)
H04N 5/355 (2011.01)
H04N 5/3745 (2011.01)
H04N 5/378 (2011.01)

(52) U.S. Cl.
CPC ........... *H04N 5/35554* (2013.01); *H04N 5/378* (2013.01); *H04N 5/37452* (2013.01)

(58) Field of Classification Search
USPC ......................................... 348/308; 250/208.1
See application file for complete search history.

(56) References Cited

U.S. PATENT DOCUMENTS

| | | | |
|---|---|---|---|
| 6,091,451 A * | 7/2000 | Farr et al. | 348/342 |
| 2005/0231618 A1* | 10/2005 | Sugiyama | 348/273 |
| 2006/0023078 A1* | 2/2006 | Schmitt et al. | 348/222.1 |
| 2010/0328490 A1* | 12/2010 | Kurane et al. | 348/229.1 |
| 2014/0022452 A1* | 1/2014 | Ivanovic et al. | 348/441 |
| 2014/0211538 A1* | 7/2014 | Lee et al. | 365/148 |
| 2014/0326856 A1* | 11/2014 | Massetti, Dominic | 250/208.1 |

* cited by examiner

*Primary Examiner* — Sinh Tran
*Assistant Examiner* — Zhenzhen Wu
(74) *Attorney, Agent, or Firm* — Faegre Baker Daniels LLP

(57) ABSTRACT

Generally, an integrated circuit, an apparatus and a method for buffering analog information capture first analog information with a capture element and store at least portions of the analog information in a first passive variable resistance memory element coupled to the capture element and in a second passive variable resistance memory element. The portions of the analog information stored in the first passive variable resistance memory element and in the second passive variable resistance memory element may be the same or may be different.

36 Claims, 11 Drawing Sheets

METHOD AND APPARATUS FOR BUFFERING ANALOG INFORMATION

BACKGROUND OF THE DISCLOSURE

The disclosure relates generally to a method and an apparatus for buffering analog information output by a capture element.

A known integrated circuit (IC) with a capture array employs an analog to digital (ADC) converter to convert the analog information captured by the capture array into digital data. The digital data is buffered in a digital memory. The output rate of the IC depends on the speed of the ADC converter. The digital data may be further processed before it is output through a serial or parallel output interface.

FIG. 1 illustrates an example of a known pixel logic circuit 100 that employs a capture element 102 and multiple switches 104, 106, and 108 arranged to reset, amplify and read the analog, or pixel, information from capture element 102. The read analog information passes through a column amplifier 110 and an ADC 112 before it is available as a digital pixel output 114. Capture element 102 may be one of multiple multiplexed pixels of an imaging sensor.

FIG. 2 illustrates a timing diagram 200 for capture element 102. Timing diagram 200 illustrates that after a reset time Trst, an integration time Tint begins. During Tint, capture element 102 collects electromagnetic radiation. The length of Tint determines the aperture of capture element 102. Subsequently, at Ts, a sample is read from capture element 102, which is subsequently converted to digital pixel output 114 during Tadc. Ttotal represents the time required to convert electromagnetic radiation to digital pixel values. Rows 1 and 2 of timing diagram 200 illustrate an example of a rolling shutter, where the Tadc periods follow one another and the samples are taken according to the desired aperture such that all the samples have the same integration time, e.g. the same aperture length. In a global shutter arrangement, the capture elements are reset at the same time and the aperture lengths vary depending on for how long the analog information is captured by the capture elements. A complementary metal oxide semiconductor (CMOS) image sensor typically uses a rolling shutter while a charge coupled device (CCD) typically uses a global shutter. The CCD shifts the pixel information substantially simultaneously to adjacent elements, from which the pixel information is obtained. Subsequent frames of pixel information cannot be obtained until the prior information has been read, therefore the ADC remains the bottleneck.

FIG. 3 illustrates a known imaging sensor circuit 300 comprising a pixel array 302. Column amplifiers 110, a row decoder 320, a column multiplexer 322 and control logic 324 read out the analog information from pixel array 302 through ADC 112. Digital pixel output 114 typically has a frame rate equal to display rates at which video appears normal, which may be referred to as the normal speed display rate. Digital pixel output 114 is stored in a random access memory (RAM) buffer 306. An in-process image 308 is compiled in buffer 306 as the pixel information is converted.

It is also known to combine multiple images in a high dynamic range (HDR) image. Multiple images of a common scene can be obtained with multiple image sensor arrays. However, the optical centers and the view angles of the image sensor arrays will differ. In another known approach, multiple images taken at different points in time are combined. In both cases, the resulting HDR images suffer loss of detail due to the spatial or the temporal, or motion, disparities between the images. The complexity of the HDR image combination process is increased to compensate, to the extent possible, for the disparities.

A need exists for methods and apparatus to decouple the rate at which analog information is captured from the rate at which the analog information is converted to digital data.

SUMMARY OF EMBODIMENTS OF THE DISCLOSURE

Embodiments of a method, an integrated circuit and an apparatus for capturing analog information with a capture element are disclosed herein. In one embodiment, a method of capturing analog information includes capturing first analog information and second analog information with a capture element; storing the first analog information in a first passive variable resistance memory (PVRM) element coupled to the capture element; and storing the second analog information in a second PVRM element coupled to the capture element.

In one variation of a present embodiment, the method further includes buffering the analog information to decouple capturing the analog information from converting the analog information to digital data.

In another variation of a present embodiment, the method further includes capturing the analog information at a capture rate, converting at least a portion of the analog information to digital data at a conversion rate which is slower than the capture rate, and discarding at least another portion of the analog information.

In a further variation of a present embodiment, the method further includes concurrently writing, at least sometimes, to the first PVRM element and to the second PVRM element.

In a yet further variation of a present embodiment, the first analog information is the same as the second analog information, and the first analog information and the second analog information are stored in the first PVRM element and the second PVRM element to provide redundancy buffering.

In another embodiment, an integrated circuit is disclosed. The integrated circuit includes a capture element operable to capture analog information; a first passive variable resistance memory (PVRM) element coupled to the capture element; a second PVRM element coupled to the capture element; and control logic operable to write at least portions of the analog information to the first PVRM element and to the second PVRM element.

In one variation of a present embodiment, the integrated circuit has a capture side and an opposite side opposite the capture side, and the first PVRM element is disposed between capture elements or intermediate the capture element and the opposite side.

In another variation of a present embodiment, the control logic of the integrated circuit is operable to concurrently write, at least sometimes, to the first PVRM element and to the second PVRM element.

In a further variation of a present embodiment, the control logic of the integrated circuit is operable to, before completing conversion of first analog information stored in the first PVRM element into digital data, begin writing second analog information to the second PVRM element.

In a yet further variation of a present embodiment, the control logic of the integrated circuit is operable to stop writing first analog information to the first PVRM element at a first exposure length to achieve a first exposure, and to stop writing second analog information to the second PVRM element at a second exposure length to achieve a second exposure different than the first exposure.

In a yet further variation of a present embodiment, the control logic of the integrated circuit is further operable to store the analog information in the first PVRM element and in the second PVRM element to provide redundancy buffering.

In a yet further variation of a present embodiment, the capture element is included in an imaging array configured to capture images, and the first PVRM element and the second PVRM element are included in PVRM arrays coupled to the imaging array, and the control logic is further configured to: capture images at a capture rate with the imaging array; store the images in the PVRM arrays; select a first group of PVRM arrays from the PVRM arrays based on a first frame rate, the images stored in the first group of PVRM arrays being operable to produce a first image stream; and select a second group of PVRM arrays from the PVRM arrays based on a second frame rate which is faster than the first frame rate, the images stored in the second group of PVRM arrays being operable to produce a slow motion image stream.

In a yet further variation of a present embodiment, the integrated circuit further includes analog to digital converting logic operable to convert first analog information stored in the first PVRM element and second analog information stored in the second PVRM element to digital data.

In a further embodiment, an apparatus configured to capture analog information is disclosed. The apparatus includes a capture element operable to capture the analog information; a first passive variable resistance memory (PVRM) element coupled to the capture element; a second PVRM element coupled to the capture element; and control logic operable to write at least portions of the analog information to the first PVRM element and to the second PVRM element.

In one variation of a present embodiment, the capture element is included in an imaging array configured to capture images, the first PVRM element and the second PVRM element are included in PVRM arrays coupled to the imaging array, and the control logic is further configured to: capture images at a capture rate with the imaging array; store the images in the PVRM arrays; select a first group of PVRM arrays from the PVRM arrays based on a first frame rate, the images stored in the first group of PVRM arrays being operable to produce a first image stream; and select a second group of PVRM arrays from the PVRM arrays based on a second frame rate which is faster than the first frame rate, the images stored in the second group of PVRM arrays being operable to produce a slow motion image stream.

In one example, the apparatus further includes a display, a processor, and a non-transitory computer readable medium having stored therein a program which when executed by the processor causes the processor to present the first image stream on the display.

In another variation of a present embodiment, the control logic is operable to concurrently write, at least sometimes, to the first PVRM element and to the second PVRM element.

In a further variation of a present embodiment, the capture element, the first passive variable resistance memory (PVRM) element, the second PVRM element and the control logic are integrated in an integrated circuit.

In a yet further variation of a present embodiment, the control logic is operable to, before completing conversion of first analog information stored in the first PVRM element into digital data, begin writing second analog information to the second PVRM element.

In a yet further variation of a present embodiment, the control logic is operable to stop writing first analog information to the first PVRM element at a first exposure length to achieve a first exposure, and to stop writing second analog information to the second PVRM element at a second exposure length to achieve a second exposure different than the first exposure.

In a yet further variation of a present embodiment, the control logic is further operable to store the analog information in the first PVRM element and in the second PVRM element to provide redundancy buffering.

In yet another embodiment, a non-transitory computer readable medium is disclosed. The non-transitory computer readable medium includes executable instructions that when executed by an integrated circuit fabrication system, causes the integrated circuit fabrication system to produce an integrated circuit that includes: a capture element operable to capture analog information; a first passive variable resistance memory (PVRM) element coupled to the capture element; a second PVRM element coupled to the capture element; and control logic operable to write at least portions of the analog information to the first PVRM element and to the second PVRM element.

In one variation of a present embodiment, the integrated circuit has a capture side and an opposite side opposite the capture side, and the first PVRM element is disposed between capture elements or intermediate the capture element and the opposite side.

In another variation of a present embodiment, the integrated circuit has a capture side and an opposite side opposite the capture side, and the first PVRM element is disposed between capture elements or intermediate the capture element and the opposite side.

In a yet further variation of a present embodiment, the control logic is operable to concurrently write, at least sometimes, to the first PVRM element and to the second PVRM element.

In a yet further variation of a present embodiment, the control logic is operable to, before completing conversion of first analog information stored in the first PVRM element into digital data, begin writing second analog information to the second PVRM element.

In a yet further variation of a present embodiment, the control logic is operable to stop writing first analog information to the first PVRM element at a first exposure length to achieve a first exposure, and to stop writing second analog information to the second PVRM element at a second exposure length to achieve a second exposure different than the first exposure.

In a yet further variation of a present embodiment, the control logic is further operable to store the analog information in the first PVRM element and in the second PVRM element to provide redundancy buffering.

In a yet further variation of a present embodiment, the capture element is included in an imaging array configured to capture images, the first PVRM element and the second PVRM element are included in PVRM arrays coupled to the imaging array, and the control logic is further configured to: capture images at a capture rate with the imaging array; store the images in the PVRM arrays; select a first group of PVRM arrays from the PVRM arrays based on a first frame rate, the images stored in the first group of PVRM arrays being operable to produce a first image stream; and select a second group of PVRM arrays from the PVRM arrays based on a second frame rate which is faster than the first frame rate, the images stored in the second group of PVRM arrays being operable to produce a slow motion image stream.

In a yet further variation of a present embodiment, the integrated circuit also includes analog to digital converting logic operable to convert first analog information stored in the first PVRM element and second analog information stored in the second PVRM element to digital data.

BRIEF DESCRIPTION OF THE DRAWINGS

The above-mentioned and other disclosed features, and the manner of attaining them, will become more apparent and will be better understood by reference to the following description of disclosed embodiments taken in conjunction with the accompanying drawings, wherein.

Figure 1:
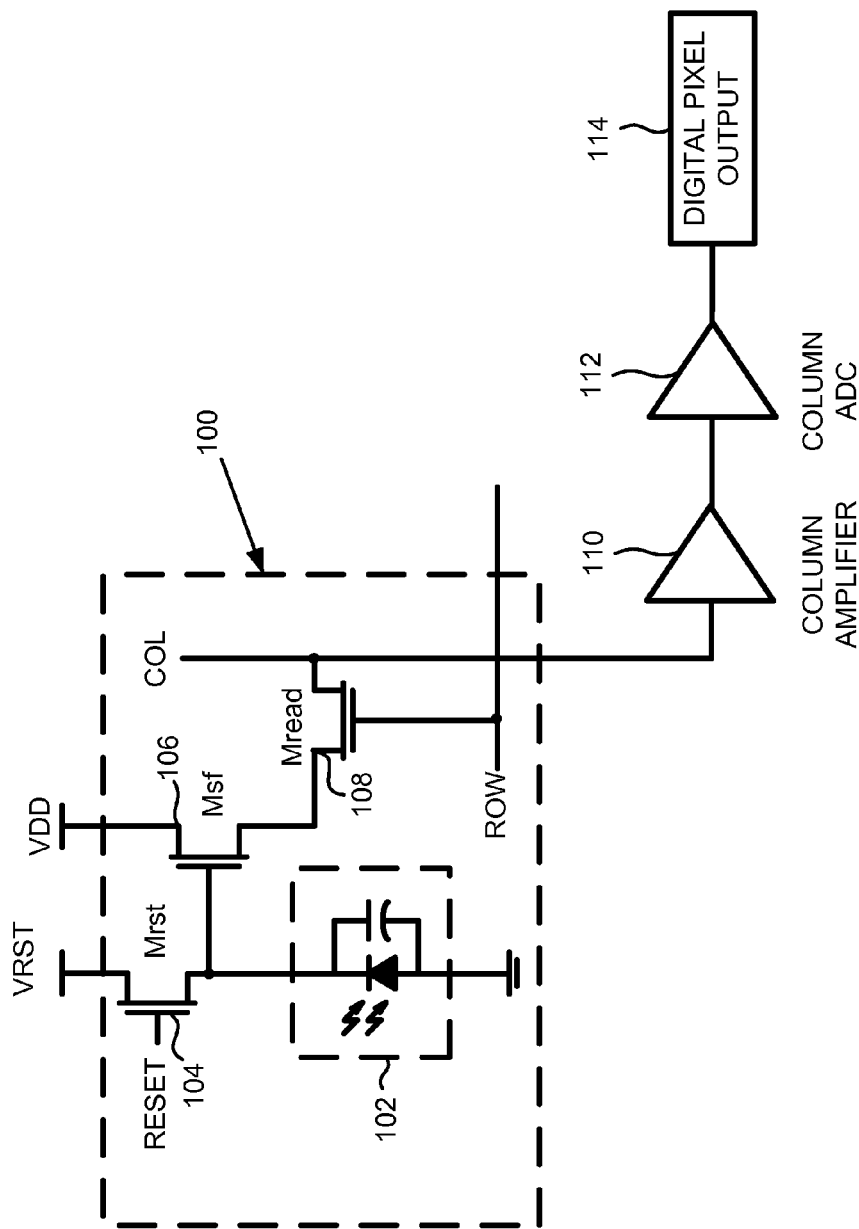
FIG. 1 is a schematic diagram illustrating a prior art capture element circuit.
Figure 2:
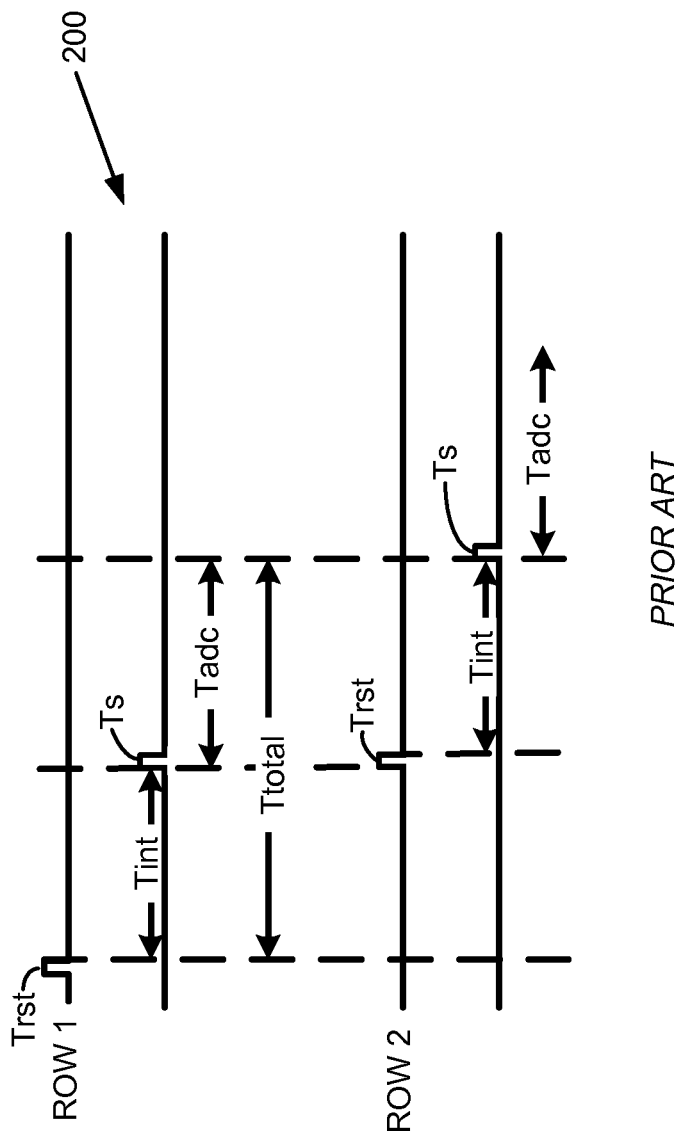
FIG. 2 is a timing diagram illustrating the capture timing of the capture element circuit of FIG. 1.
Figure 3:
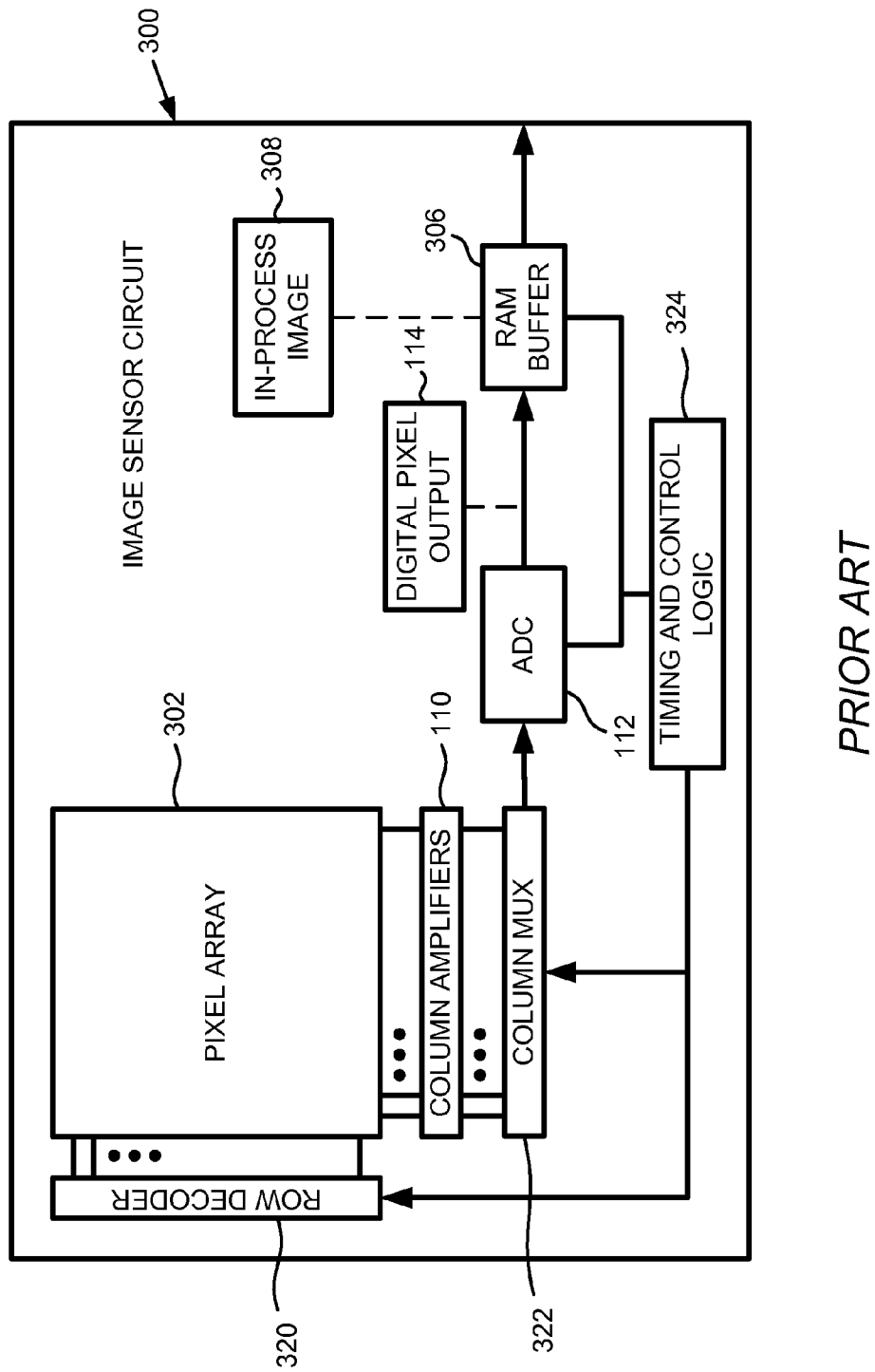
FIG. 3 is a block diagram illustrating a prior art image sensor circuit including a pixel array for capturing analog information.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present invention. The exemplification set out herein illustrates embodiments of the disclosure, and such exemplifications are not to be construed as limiting the scope of the invention in any manner.

DETAILED DESCRIPTION

Briefly, an integrated circuit stores analog information read from a capture element into two or more PVRM elements coupled to the capture element. Storing is performed without first converting the analog information to digital data, thereby decoupling capture and conversion. Control logic may independently control the store timing for each PVRM element. The control logic causes storage of the analog information in the PVRM elements by allowing current to flow through them for a time based on the analog information. The control logic may cause current to flow concurrently through the PVRM elements and may start and stop the current flow through each PVRM element at different times. Multiple capture elements may form an array and each may be coupled, individually, to elements of multiple PVRM arrays.

Among other advantages, disclosed and claimed embodiments enable decoupling of the rate at which analog information is captured from the rate at which the analog information is converted to digital data by an ADC. A capture array may be an imaging array. In one embodiment, the control logic causes the imaging array to capture images at a rate faster than the conversion rate of the ADC. The captured images are stored in PVRM arrays and selectively converted to digital images. In one example, a first group of PVRM arrays is selected based on a first frame rate to produce a first image stream and a second group of PVRM arrays is selected based on a second frame rate, which is faster than the first frame rate, to produce a slow motion image stream. Advantageously, generation of the faster image stream does not require an ADC capable of converting the images at the faster read rate. In another example, the control logic causes the imaging array to concurrently capture portions of images and to capture the images at varying apertures. The images may be combined to produce HDR images and video with reduced temporal and spatial disparities. A further advantage is that the PVRM elements may be layered between or below the capture elements to fill space, thereby enabling analog buffering without increasing the capture area. A yet further advantage is that, for time periods corresponding to the buffer depth, it is possible to capture more bandwidth to improve the granularity of the information and to raise the frame rate above the Nyquist rate. The multiple PVRM arrays may also be used as a redundancy buffer to increase a system's reliability. Since the PVRM arrays are persistent, data is saved even if power is lost.

Integrated circuits as described above and below are suitable in electronics devices including photo and video cameras, security systems, general safety systems, automobile safety systems including back-up and forward looking cameras, traffic systems, closed-circuit television systems, retina scanners, instant replay systems, television set-top boxes, positioning systems, slow and ultra slow motion imaging systems, high frame rate systems, and any other system in which better and/or quicker and/or less expensively obtained understanding of motion is desired.

One or more other technical advantages may be readily apparent to those skilled in the art from the figures, descriptions, and claims included herein. Moreover, while specific advantages have been enumerated above, various embodiments may include all, some or none of the enumerated advantages.

Reference will now be made to the embodiments illustrated in the drawings, which are described below. The foregoing examples and embodiments, and those disclosed below, are not intended to be exhaustive or limit the claims to the precise form disclosed in the following detailed description. Rather, the embodiments are chosen and described so that others skilled in the art may utilize their teachings. Further, the transitional term "comprising", which is synonymous with "including," or "containing," is inclusive or open-ended and does not exclude additional, unspecified elements or method steps. By contrast, the transitional term "consisting" is a closed term which does not permit addition of unspecified terms.

Figure 4:
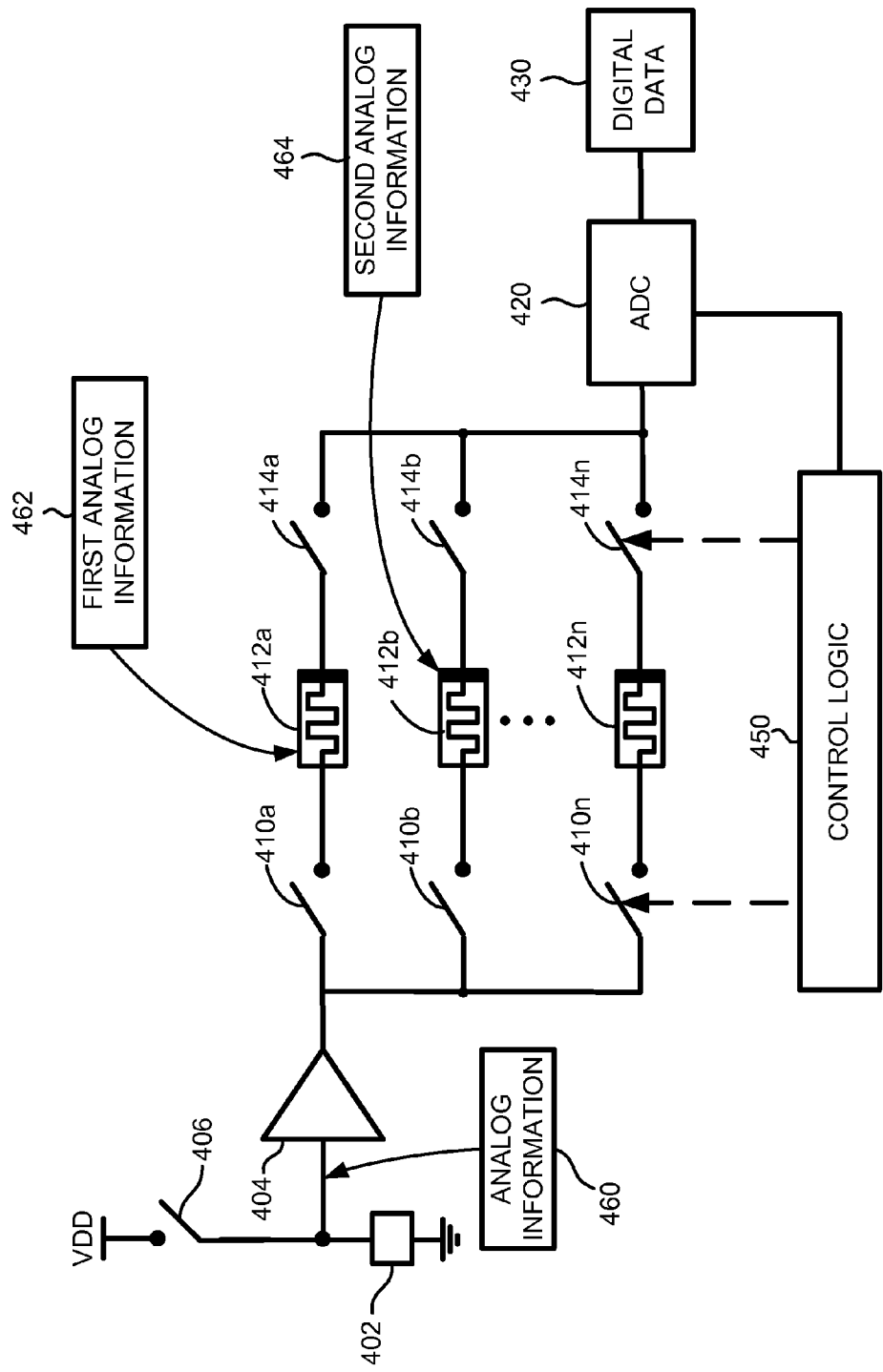
FIG. 4 is a block diagram of a capture element coupled to multiple PVRM elements in accordance with one example set forth in the disclosure.

FIG. 4 is a block diagram of an exemplary buffering circuit including a capture element 402 coupled to multiple PVRM elements 412a-n. Exemplary PVRM elements include memristors. A switch 406 is provided to disable capture element 402 when not in use. An amplifier 404 is provided to amplify the analog information, illustratively analog information 460, captured with capture element 402. It should be understood that while the signal output by capture element 402 may be amplified by amplifier 404, amplification changes the scale and not the substance of the analog information, which represents relationships between the capture elements in one set of analog information and between different sets of analog information (different images, for example). Accordingly, the analog information captured by the capture element is substantially the same information that is later buffered in a PVRM element. A pair of switches in series on each side of the PVRM element, referred to as "write" and "read" switches, control current flow. Current supplied by amplifier 404 sets the resistances of the PVRM elements when, for example, switches 410a-n are closed. The resistance set in each of the PVRM elements is proportional to the length of time the current flows through the PVRM elements. Analog information 460 includes first analog information 462, which is written to PVRM element 412a and second analog information 464, which is written to PVRM element 412b. In one example, all the write switches are closed substantially simultaneously to substantially simultaneously start writing to PVRM elements 412a-n. Alternatively, each of switches 410a-n may be controlled to close and open at different times. Switches 414a-n operate in a similar manner to enable the analog information contained therein to be read by an ADC 420. ADC 420 then produces a digital data 430. Optionally, an amplifier may be provided prior to ADC 420. Digital data 430 may comprise an image stream. Additional switches (not shown for clarity) complete the circuits and enable current to flow, at different times, in opposite directions. Reverse current flow resets the PVRM elements. An exemplary more detailed PVRM circuit is disclosed with reference to FIG. 11.

Control logic 450 controls switches 410a-n and 414a-n to establish individual element read and write rates. The rate at which the capture element captures analog information may be referred to as the capture rate. The PVRM elements function as an analog buffer between the capture element and ADC 420. Generally, the capture rate will be the same as the rate at which the analog information is written to the analog buffer. The rate at which analog information is written to each PVRM element may be as fast as the capture rate. The rate at which analog information is written to each PVRM element may also be slower than the capture rate. For example, if the analog information includes two pixels, one pixel is written to the first PVRM element and the other is written to the second PVRM element, each PVRM element is written to at half the capture rate. Of course, the capture rate and/or the write rate may comprise average values and do not need to be constant. As used herein, the term "pixel" includes sub-pixels.

In one embodiment, the first analog information and the second analog information are the same and are written to two or more PVRM elements coupled to the capture element to provide redundancy buffering. In one example, the first analog information is written to at least three PVRM elements. An arbiter processing sequence is provided to determine, in case there are discrepancies between the analog information stored in each PVRM element, which is the correct analog information.

The term "logic" or "control logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed.

The terms "circuit" and "circuitry" refer generally to hardwired logic that may be implemented using various discrete components such as, but not limited to, diodes, bipolar junction transistors, field effect transistors, etc., which may be implemented on an integrated circuit using any of various technologies as appropriate, such as, but not limited to CMOS, NMOS, PMOS etc. A "logic cell" may contain various circuitry or circuits.

Figure 5:
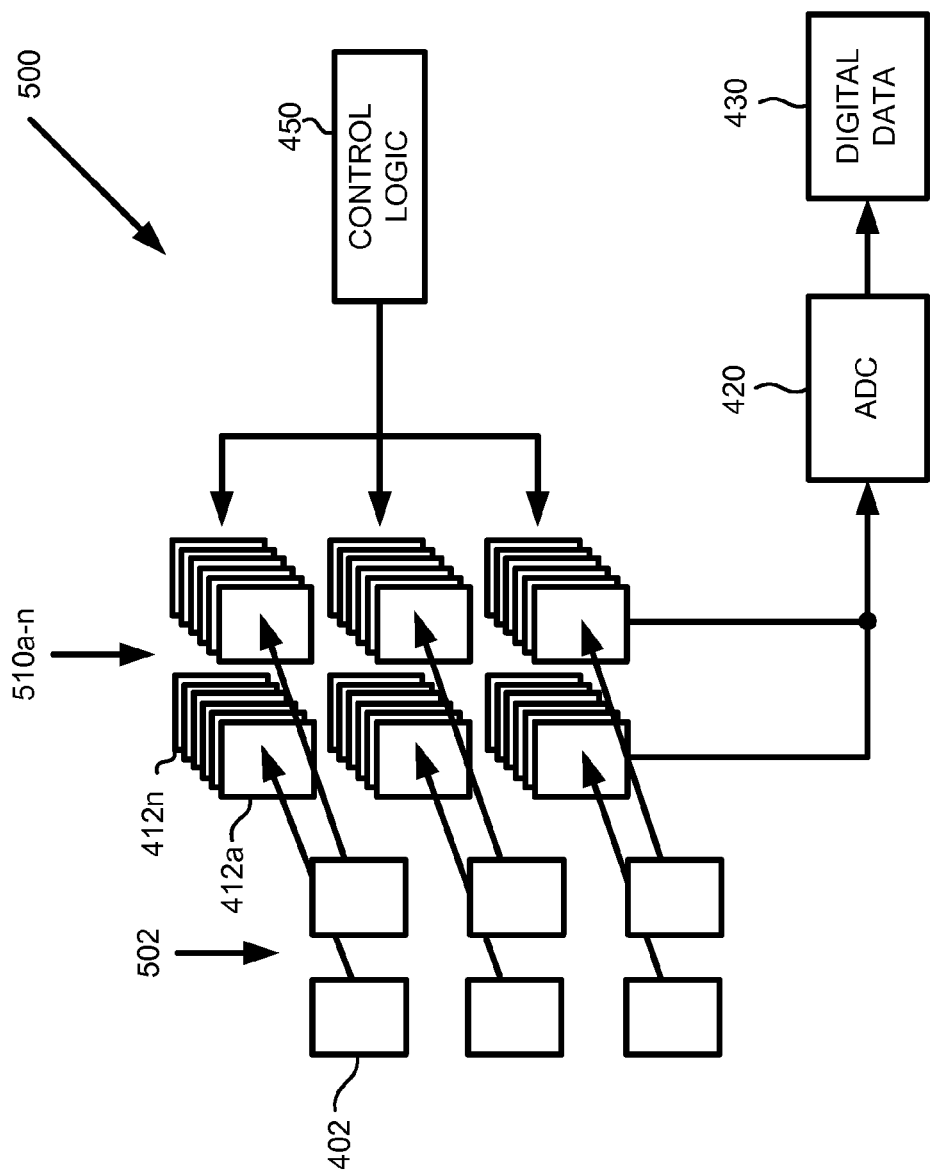
FIG. 5 is a block diagram of a circuit comprising a capture array coupled to multiple PVRM arrays in accordance with one example set forth in the disclosure.

FIG. 5 is a block diagram of a buffer circuit 500 comprising a capture array 502 including multiple capture elements 402 coupled to multiple PVRM arrays 510a-n. PVRM array 510a includes multiple PVRM elements 412a corresponding to the multiple capture elements 402. PVRM array 510b includes multiple PVRM elements 412b, etc. Control logic 450 controls operation of circuit 500 to establish read and write rates and to select which sets of analog information, e.g. from which PVRM array and in which sequence, will be made available for reading by ADC 420. In some embodiments, all the elements of a PVRM array will be written to and read substantially concurrently. In some embodiments, it may be desirable to provide control logic to enable independently reading and writing to individual elements of the PVRM array. ADC 420 may be comprised in a processing unit IC. Exemplary processing units include central, graphics and accelerated processing units and any IC incorporating a processor. In one example, a processing unit IC integrates circuit 500 with the processor. In another example, the processing unit IC integrates ADC 420 with the processor and an interface to sample the analog information from multiple PVRM arrays 510a-n.

Figure 6:
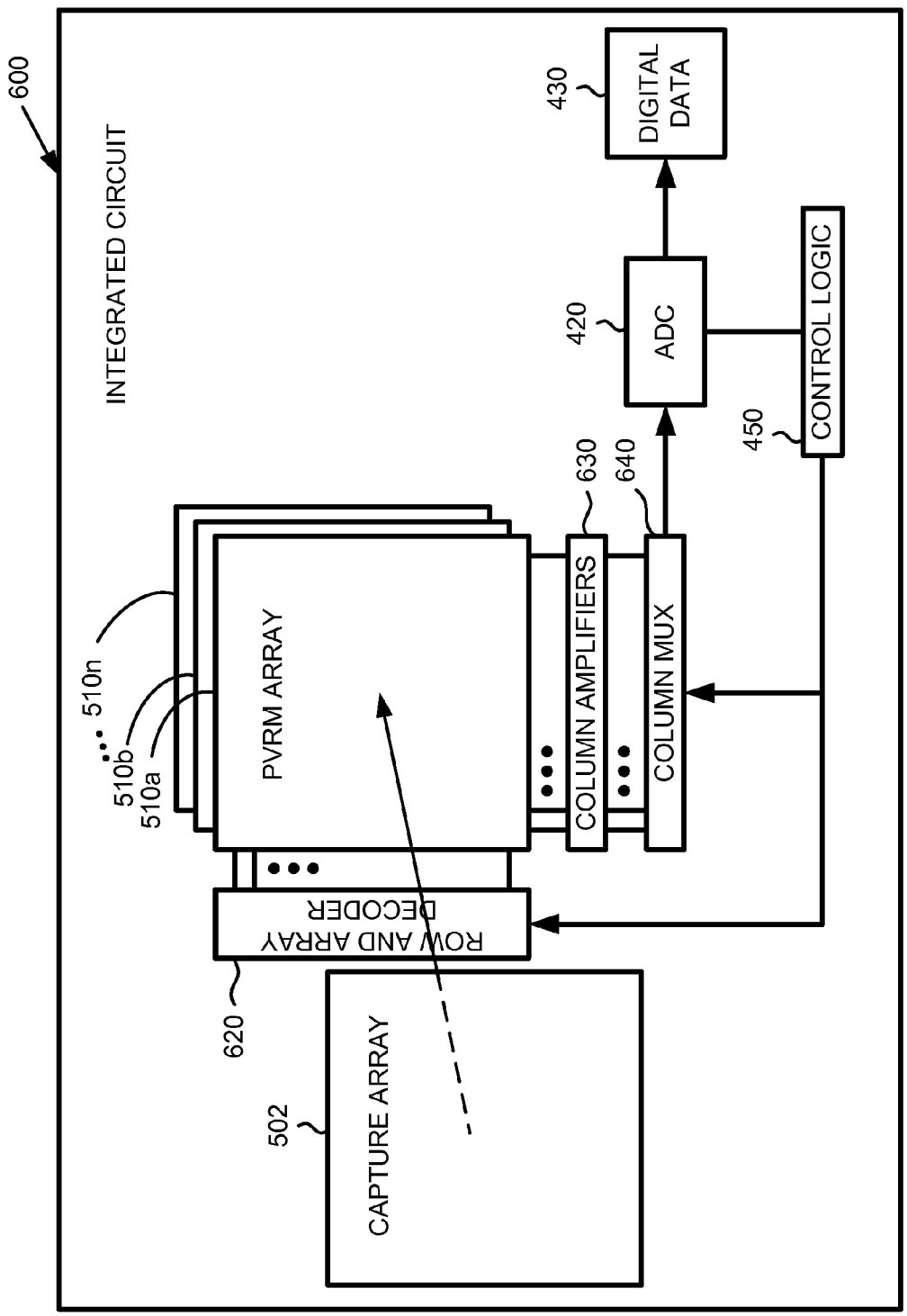
FIG. 6 is a block diagram illustrating an integrated circuit including a capture array coupled to multiple PVRM arrays in accordance with another example set forth in the disclosure.

Referring now to FIG. 6, a block diagram illustrating an integrated circuit 600 including the components of buffer circuit 500 is shown. Integrated circuit 600 also comprises a row and array decoder 620, optional column amplifiers 630 and a column multiplexer 640, which are provided to select elements of arrays by selecting, in sequence, elements of each array by rows and columns for sampling by ADC 420. In one example, the analog information from the capture array is written into a PVRM array in parallel, i.e. all the capture elements at substantially the same time rather than row by row, so row decoding is not required during the write cycle. Row decoding may still be required during the read cycle to enable the ADC to sample each PVRM element in a selected array. Additional ADC logic may be included to increase the conversion rate. Integrated circuit 600 may include additional logic known in the art for further processing digital data 430, such as a digital signal processor, a digital buffer and an output interface. PVRM arrays can be added to increase the buffer depth. The buffer depth may comprise from a few PVRM arrays to hundreds or even thousands of arrays. Exemplary ICs with capture arrays include electromagnetic radiation sensors and any other IC with an array operable to output analog information. Exemplary electromagnetic radiation sensors include image sensors such as visible and infrared light image sensors, and short wave array sensors.

Currents can flow concurrently through multiple PVRM arrays. In one example in which the capture array is an image sensor array, the aperture of each image buffered in each PVRM array is controlled by allowing current to flow for shorter or longer periods of time, referred to as the aperture length, to set different apertures corresponding to the amount of captured electromagnetic radiation. Images may be produced with the same or different apertures. Images with different apertures may be at least partially concurrent. To produce partially concurrent images, images can be captured by starting writing to PVRM arrays at the same time and ending writing at different times, or by starting writing at different times and ending writing at the same time, or by starting and ending writing at different times with at least some concurrent writing. Images captured with different apertures may be combined to produce high quality HDR images or video due to substantially reduced spatial and temporal image disparities. The buffer depth may be configured so as to store minutes or hours of images at high frame rates.

In one embodiment, images are captured by the image sensor array at a rate which is faster than the conversion rate of the ADC. The higher bandwidth improves the granularity of the information. The capture rate may be raised above the Nyquist rate with an appropriate buffer depth. The conversion rate of the ADC may be faster than the display rate at which the images will be displayed. To produce an image stream which will appear normal when displayed, only some of the buffered images are converted. Thus, if the capture rate is four times the display rate, every fourth image in the analog buffer will be converted to produce a normal image stream.

In one example, the higher capture rate may be applied selectively to provide a "boost mode" during which capturing occurs as fast as necessary. The boost mode may be triggered by a control signal based on an event. For example, a traffic camera may be used to generate a control signal to switch to boost mode when a vehicle crosses an intersection under red light to capture images of the face of the driver or the plates of the vehicle at a high frame rate. The images can then be used to produce a very high definition and/or an HDR image of the driver and/or the plate. The boost mode is described in detail with reference to FIGS. 8 and 9.

In one variation thereof, the traffic camera may capture images at the high capture rate continuously but only convert the analog information to digital data upon receiving the control signal (control signal 942 in FIG. 9), in effect allowing retroactive selection of the images to be converted. A normal speed image stream is produced until the control signal is received (e.g. first image stream 862 in FIGS. 8 and 9), at which time a slow motion image stream (e.g. second image stream 864 in FIGS. 8 and 9) is produced by converting additional images. For example, if the capture rate is four times the display rate, every fourth image is converted to produce the normal speed image stream. If every second image in the buffer is converted in boost mode, doubling the number of converted images, the resulting slow motion image stream will appear at half the normal speed. In one example, one PVRM array is integrated with an image sensor to enable doubling the capture rate of the image sensor. Two PVRM arrays may be added to triple the capture rate and so on.

The selected times may be selected with a graphical user interface (e.g. GUI 950 in FIG. 9) operable to display a boost mode control element which, when activated, initiates transmission of a control signal to trigger the boost mode. The graphical user interface may also include a duration control element operable to select the time duration of the boost mode. The graphical user interface may also include a speed control element operable to select a frame rate for determining which images will be selected for conversion. A 2× frame rate, for example, would cause selection of 2× the number of images for a given time duration compared to a 1× frame rate representing the normal speed display rate. In one example, the control elements may also be predetermined and saved in boost mode profile files. The mode profiles may be automatically selected based on given events, such as a car crossing an intersection during a red light period in high daytime traffic or low traffic or night time. The mode profiles may be predefined with the graphical user interface based on, for example, particular lighting conditions and the amount of expected object motions between images.

Figure 7:
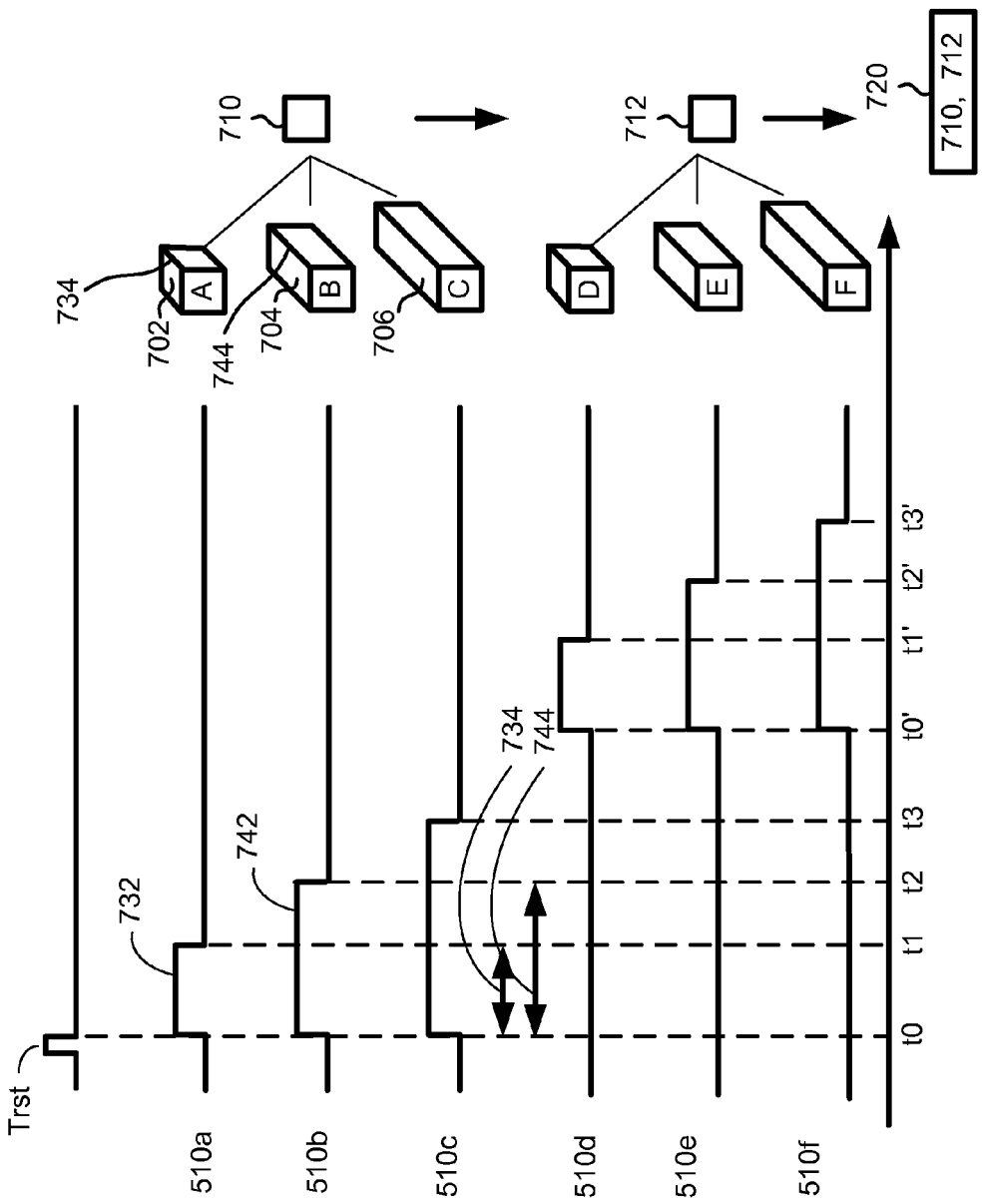
FIG. 7 is a timing diagram illustrating capture timing of the capture array shown in FIG. 6 in accordance with a further example set forth in the disclosure.

FIG. 7 is a timing diagram illustrating an embodiment of a buffering method in which the timing of PVRM arrays 510a-f is controlled to produce sets of analog information having different array write lengths. Pulse 732 represents the array write length of information captured by PVRM array 510a. Times t0 and time t1 correspond to the beginning and ending capture times of pulse 732, and a line from time t0 to t1 represents the array write length 734 of pulse 732. Similarly, time t2 represents the ending write time of pulse 742. A cube 702 is shown to represent a set of analog information written into PVRM array 510a, represented by the letter A. The cube's depth represents array write length 734. Cubes 704 and 706 represent information written into PVRM arrays 510b and 510c. An array write length 744 of the information written into PVRM array 510b is also shown. In one example, the letters A, B and C correspond to three images of varying apertures, in which case the array write lengths comprise aperture lengths. After conversion, the now digital images may be combined into an HDR image 710. Similarly, images D, E and F may be combined into an HDR image 712. HDR images 710 and 712 may be combined into a video stream 720.

Figure 8:
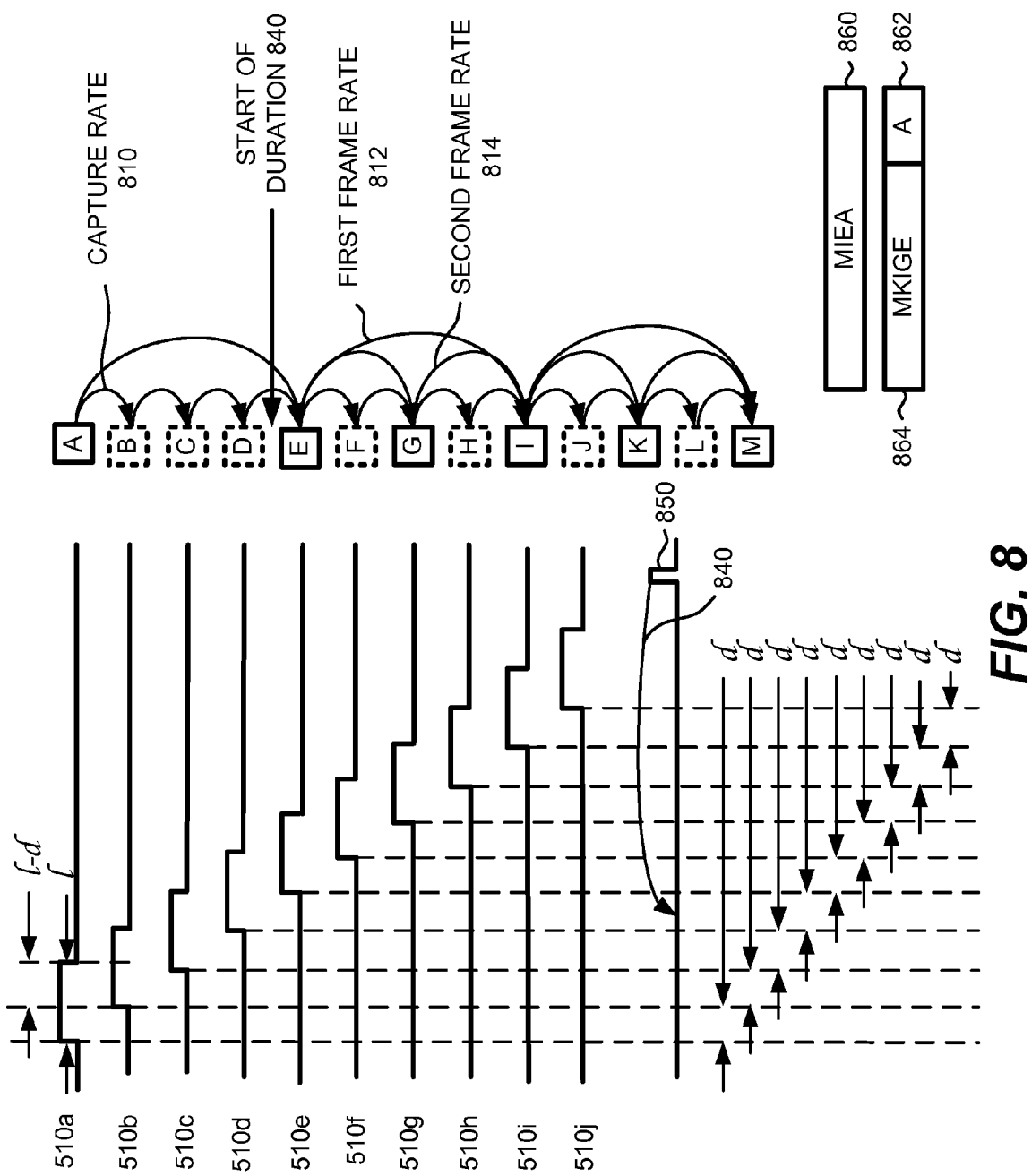
FIG. 8 is another timing diagram illustrating capture timing of the capture array shown in FIG. 6 in accordance with another example set forth in the disclosure.

FIG. 8 is a timing diagram illustrating another embodiment of a buffering method in which the timing of PVRM arrays 510a-j is controlled to produce sets of partially concurrent analog information having the same array write lengths. Each of the pulses represented in the timing diagram is delayed relative to the preceding pulse by a time delay d. As each pulse has a length l>d, sequential pairs of pulses are concurrent during a time l–d. Of course, d and l can also be selected to avoid concurrency. In one example, the capture array is an image sensor array and the letters A-M correspond to images captured in the PVRM arrays at a capture rate 810. In this example, the images may be selected for conversion based on a first frame rate 812, i.e. every fourth PVRM array and image, corresponding, for example, to a normal speed display rate. Images A, E, I and M would be converted (i.e. image stream 860 showing images MIEA in the order of conversion) and images BCD, FGH and JKL would be discarded. However, a control signal 850 is received, which triggers production of an alternate motion sequence predetermined to start a time duration 840 prior to receipt of control signal 850. Due to the buffering of images A-M, it is then possible to switch from selecting PVRM arrays, and thereby the images stored therein, for conversion based on first frame rate 812 to a second, faster, frame rate 814. Then, images E, G, I, K and M are converted and images F, H, J and L are not converted. In the present example, images are discarded from the analog buffer are not converted to digital images. When images E, G, I, K and M are presented at the normal speed display rate, they will appear to slow time by half. The result after conversion is a first image stream 862 including image A corresponding to first frame rate 812, and a second image stream 864 corresponding to second frame rate 814 showing images MKIGE, in the order of conversion. Second image stream 864 will appear slower when displayed at the normal speed display rate. Streams 860, 862 and 864 demonstrate that more images fit in the same period of time in streams 862 and 864 as compared to image stream 860. Time duration 840 may be determined by the depth of the analog buffer. In another example, the method may be applied to fast forward upon receipt of control signal 850. In the present example, images corresponding to a third frame rate, slower than first frame rate 812, are selected for conversion. Accordingly, an even larger number of images are discarded rather than converted. A third image stream comprising images corresponding to the third frame rate will appear faster when displayed. The foregoing examples are well suited for video recording systems, video camera devices, security systems, and any other system in which alternate motion, i.e. acceleration or deceleration of the video stream, is desired.

Figure 9:
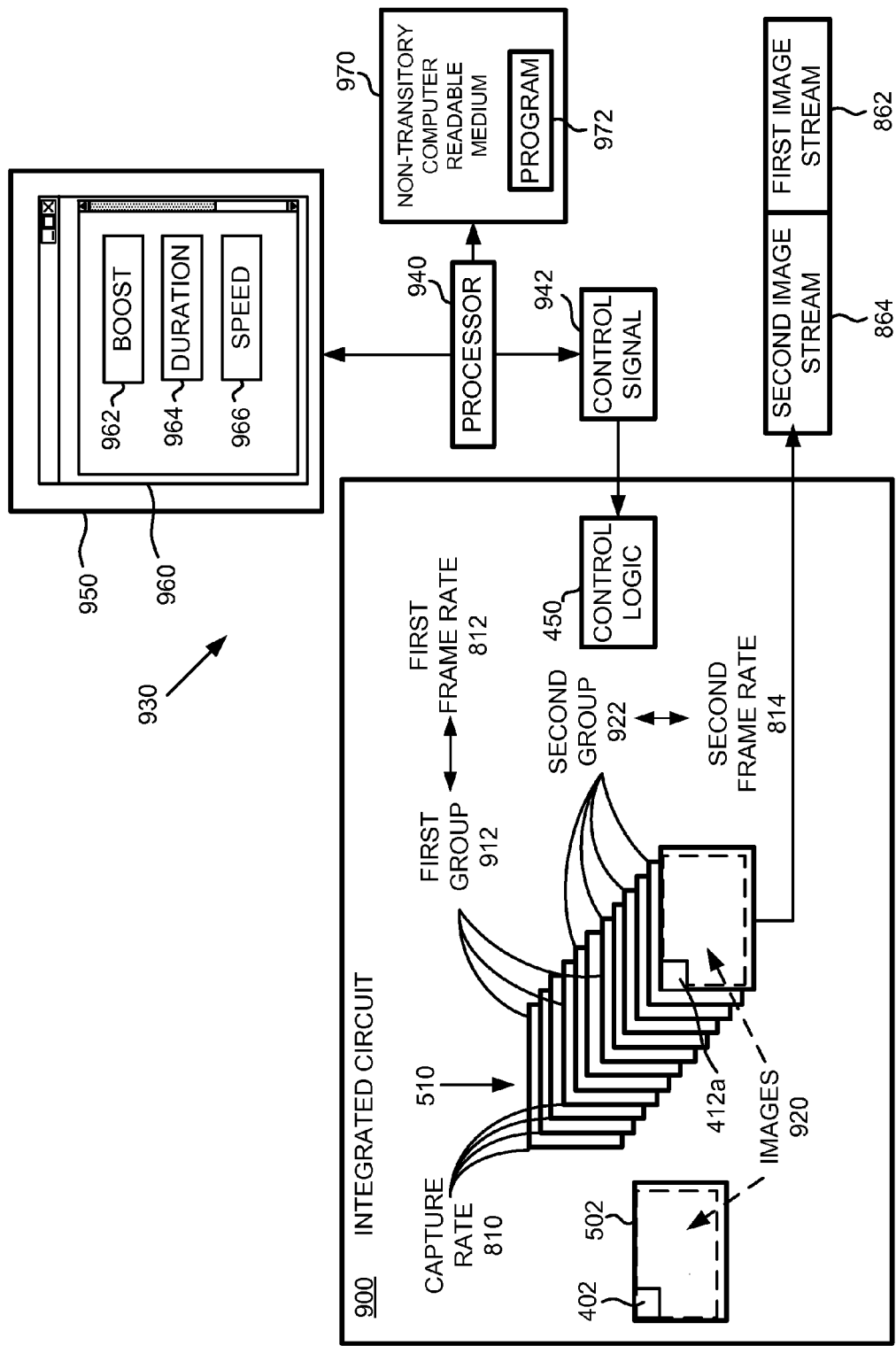
FIG. 9 is a block diagram of an embodiment of an apparatus in accordance with another example set forth in the disclosure.

FIG. 9 is a block diagram of an embodiment of an apparatus 930 configured to implement the boost mode. Examples of apparatus 930 include a video camera, an automobile safety camera, a security system, a tablet, a smart phone, a gaming console, a video conferencing system, a television set top box, a scanner, a copier, and any apparatus capable of capturing pixels. Apparatus 930 includes an integrated circuit 900 including an imaging array 502 and multiple PVRM arrays 510 comprising the analog buffer. Imaging array 502 includes multiple capture elements 402 and each PVRM array 510 includes multiple PVRM elements 412. Each capture element of the capture array is coupled to corresponding PVRM elements in each PVRM array. Analog information captured by imaging array 502 comprises images 920 written to the analog buffer at capture rate 810. As indicated before, the write rate corresponds to the rate at which images are written to the analog buffer and is therefore equivalent to the capture rate. The write rate is to be distinguished from the array write rate, which is the rate at which analog information is written to an individual array. Apparatus 930 also includes a processor 940, a display 950, a graphical user interface (GUI) 960, a memory 970 and a program 972 embedded in a non-transitory computer readable medium, e.g. memory, 970 and configured to present GUI 960 with display 950 when executed by processor 940, as known in the art. Processor 940 may be integrated in integrated circuit 900. Processor 940 is also configured to transmit a control signal 942 upon receipt, via GUI 960, of a control command 962 from a user. A boost mode command is shown. GUI 960 also includes control objects for receiving a boost duration command 964 and a boost speed command 966. A normal speed image stream, e.g. first image stream 862, is produced until control signal 942 is received by control logic 450, at which time a slow motion image stream, e.g. second image stream 864, is produced by converting additional images. Images are read from a first group 912 of PVRM arrays 510 and from a second group 922 of PVRM arrays 510. The images read from first group 912 of PVRM arrays 510 produce first image stream 862. The images read from second group 922 of PVRM arrays 510 produce second image stream 864. The user may use boost duration command 954 to specify the duration, or length, of second image stream 864. The user may use boost speed command 956 to select second frame rate 814. The combination of the boost duration and speed determines the number of PVRM arrays 510 in second group 922. Control objects may also be configured to define mode profiles. In another embodiment, control signal 942 is provided automatically by an external sensor or based on analysis of the images.

In one variation of the present embodiment, images written to the analog buffer are tagged to distinguish frame rates. Tagging may be performed by programming some of the PVRM elements of each array with frame rate codes, for example. Tagging may also be performed by writing to a buffer information related to the frame rates and the arrays, thus indirectly tagging the images. In one example, images except normal frame rate images are tagged. During playback from the GUI, a selection can be made whether to playback only the normal frame rate stream, hence discarding the tagged stream, or to playback all the images. In another example, images are tagged according to different frame rates. During playback from the GUI, a speed selection can be made to select a frame rate. The images tagged with a frame rate different than the selected frame rate are discarded.

Figure 10:
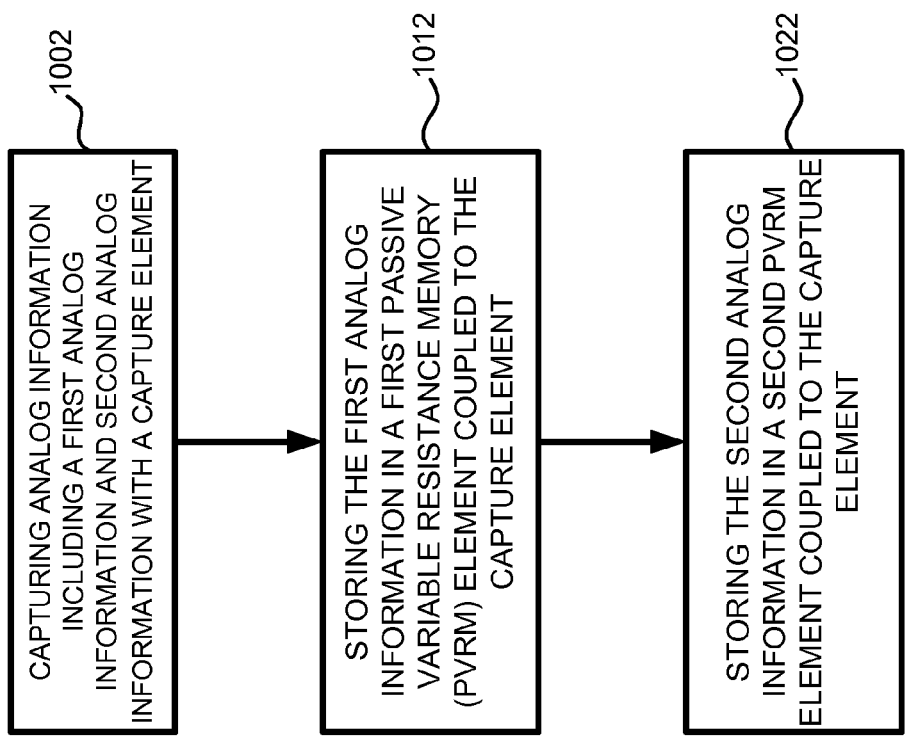
FIG. 10 is a flowchart of an embodiment of a method for buffering analog information in accordance with examples set forth in the disclosure.

FIG. 10 is a flowchart of an embodiment of a method for buffering analog information. The method comprises, at 1002, capturing analog information including a first analog information and a second analog information with a capture element. Further, the method comprises, at 1012, storing the first analog information in a first passive variable resistance memory (PVRM) element coupled to the capture element and, at 1022, storing the second analog information in a second PVRM element coupled to the capture element.

In another embodiment, the first analog information and the second analog information are the same and are written to two or more PVRM arrays coupled to the capture array to provide redundancy buffering. In one example, the first analog information is written to at least three PVRM arrays. An arbiter processing sequence is provided to determine, in case there are discrepancies between the analog information stored in each PVRM array, which is the correct analog information.

Figure 11:
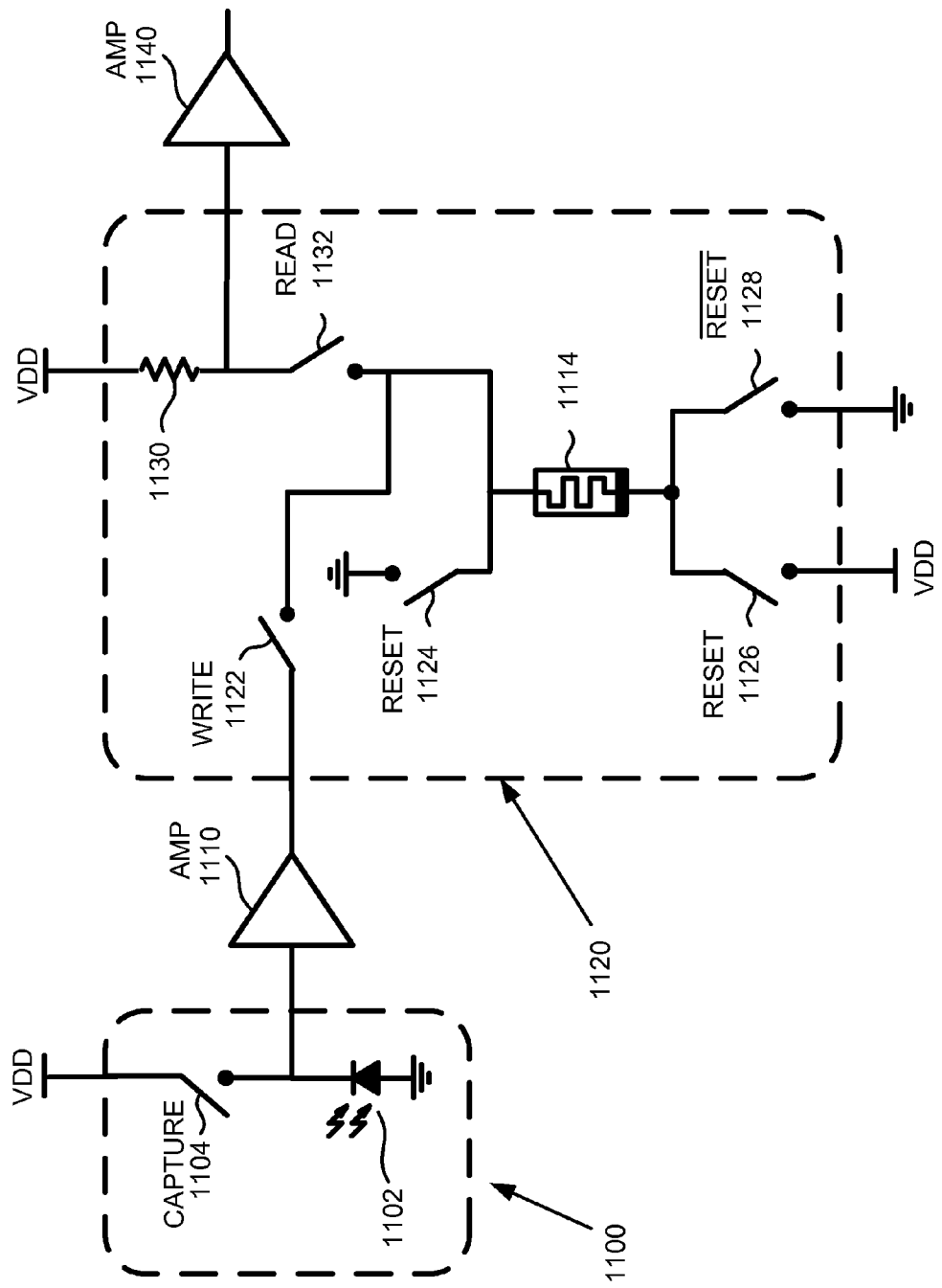
FIG. 11 is a schematic diagram illustrating logic for capturing analog information with a PVRM element in accordance with an example set forth in the disclosure.

FIG. 11 is a schematic diagram illustrating logic for capturing analog information with a PVRM element 1114. The capture logic comprises a capture circuit 1100 including a capture element 1102 and a capture switch 1104, and an amplifier 1110. These elements function in the manner described with reference to, respectively, capture element 402, switch 406 and amplifier 404. Capture switch 1104 may be opened so that capture element 1102 and amplifier 1110 do not consume power when it is not necessary to capture analog information. The capture logic also comprises a write switch 1122 and a read switch 1132, which is pulled up by a resistor 1130 tied to voltage supply VDD, reset switches 1124 and 1126, and inverse reset switch 1128. Resistor 1130 should have a large resistance to minimize signal degradation. Write switch 1122 is closed to write, i.e. capture, analog information from capture element 1102 into PVRM element 1114 and open otherwise. Read switch 1132 is closed to read information from PVRM element 1114 by amplifier 1140 and open otherwise. Reset switches 1124 and 1126 are closed to reset a PVRM element 1114 to allowing current flow from VDD to ground. In one example, the PVRM arrays are reset just prior to the write cycle, to enable multiple sampling of the analog information. In another example, the PVRM arrays are reset after the read cycle to remove the reset event from the critical path.

The above detailed description of the invention and the examples described therein have been presented only for the purposes of illustration and description. It is therefore contemplated that the present invention cover any and all modifications, variations or equivalents that fall within the spirit and scope of the basic underlying principles disclosed above and claimed herein.

What is claimed is:

1. A method for buffering analog information, the method comprising:

capturing the analog information, including first analog information and second analog information with a capture element, wherein the capture element is comprised by an imaging array configured to capture images;

storing the first analog information in a first passive variable resistance memory (PVRM) element coupled to the capture element;

storing the second analog information in a second PVRM element coupled to the capture element, wherein the first PVRM element and the second PVRM element are comprised by PVRM arrays coupled to the imaging array;

capturing images at a write rate with the imaging array;

storing the images in the PVRM arrays;

selecting a first group of PVRM arrays from the PVRM arrays based on a first frame rate, the images stored in the first group of PVRM arrays being operable to produce a first image stream; and selecting a second group of PVRM arrays from the PVRM arrays based on a second frame rate which is faster than the first frame rate, the images stored in the second group of PVRM arrays being operable to produce a slow motion image stream.

2. A method as in claim 1, further comprising buffering the analog information to decouple capturing the analog information from converting the analog information to digital data.

3. A method as in claim 2, further comprising capturing the analog information at a capture rate faster than a Nyquist rate.

4. A method as in claim 1, further comprising capturing the analog information at a capture rate, converting at least a portion of the analog information to digital data at a conversion rate which is slower than the capture rate, and discarding at least another portion of the analog information.

5. A method as in claim 1, further comprising receiving a control signal; and selecting the second group of PVRM arrays after receiving the control signal.

6. A method as in claim 5, further comprising presenting with a graphical user interface information concerning a control command; receiving the control command from a user; and generating the control signal based on the control command to produce the slow motion image stream.

7. A method as in claim 1, further comprising concurrently writing, at least sometimes, to the first PVRM element and to the second PVRM element.

8. A method as in claim 7, further comprising converting the first analog information to digital data and, before completing conversion of the first analog information to digital data, beginning writing of the second analog information to the second PVRM element.

9. A method as in claim 7, further comprising stopping writing of the first analog information at a first exposure length to achieve a first exposure, and stopping writing of the second analog information at a second exposure length to achieve a second exposure different than the first exposure.

10. A method as in claim 9, further comprising generating at least one of a high dynamic range image and a high dynamic range video, based at least in part on the first analog information and on the second analog information.

11. A method as in claim 1, wherein the first analog information is the same as the second analog information, and the first analog information and the second analog information are stored in the first PVRM element and the second PVRM element to provide redundancy buffering.

12. An integrated circuit comprising:
a capture element operable to capture analog information;
a first passive variable resistance memory (PVRM) element coupled to the capture element;
a second PVRM element coupled to the capture element; and
control logic operable to write at least portions of the analog information to the first PVRM element and to the second PVRM element, wherein the capture element is comprised by an imaging array configured to capture images, the first PVRM element and the second PVRM element are comprised by PVRM arrays coupled to the imaging array, and the control logic is further configured to:
capture images at a capture rate with the imaging array;
store the images in the PVRM arrays;
select a first group of PVRM arrays from the PVRM arrays based on a first frame rate, the images stored in the first group of PVRM arrays being operable to produce a first image stream; and
select second group of PVRM arrays from the PVRM arrays based on a second frame rate which is faster than the first frame rate, the images stored in the second group of PVRM arrays being operable to produce a slow motion image stream.

13. An integrated circuit as in claim 12, wherein the integrated circuit has a capture side and an opposite side opposite the capture side, and the first PVRM element is disposed between capture elements or intermediate the capture element and the opposite side.

14. An integrated circuit as in claim 12, wherein the control logic is operable to concurrently write, at least sometimes, to the first PVRM element and to the second PVRM element.

15. An integrated circuit as in claim 12, wherein the control logic is operable to, before completing conversion of first analog information stored in the first PVRM element into digital data, begin writing second analog information to the second PVRM element.

16. An integrated circuit as in claim 12, wherein the control logic is operable to stop writing first analog information to the first PVRM element at a first exposure length to achieve a first exposure, and to stop writing second analog information to the second PVRM element at a second exposure length to achieve a second exposure different than the first exposure.

17. An integrated circuit as in claim 12, wherein the control logic is further operable to store the analog information in the first PVRM element and in the second PVRM element to provide redundancy buffering.

18. An integrated circuit as in claim 17, wherein the control logic is further operable to receive a control signal and select the second group of PVRM arrays after receiving the control signal.

19. An integrated circuit as in claim 12, further comprising analog to digital converting logic operable to convert first analog information stored in the first PVRM element and second analog information stored in the second PVRM element to digital data.

20. An apparatus configured to capture analog information, the apparatus comprising:
a capture element operable to capture the analog information;
a first passive variable resistance memory (PVRM) element coupled to the capture element;
a second PVRM element coupled to the capture element; and
control logic operable to write at least portions of the analog information to the first PVRM element and to the second PVRM element, wherein the capture element is comprised by an imaging array configured to capture images, the first PVRM element and the second PVRM element comprised by PVRM arrays coupled to the imaging array, and the control logic is further configured to:
capture images at a capture rate with the imaging array;
store the images in the PVRM arrays;
select a first group of PVRM arrays from the PVRM arrays based on a first frame rate, the images stored in the first group of PVRM arrays being operable to produce a first image stream; and
select a second group of PVRM arrays from the PVRM arrays based on a second frame rate which is faster than the first frame rate, the images stored in the second group of PVRM arrays being operable to produce a slow motion image stream.

21. An apparatus as in claim 20, further comprising a user interface configured to provide information to a user concerning a control command and to receive the control command from the user, wherein the control logic is further operable select the second group of PVRM arrays after the user interface receives the control command from the user.

22. An apparatus as in claim 20, further comprising a display, a processor, and a non-transitory computer readable medium having stored therein a program which when executed by the processor causes the processor to present the first image stream on the display.

23. An apparatus as in claim 20, wherein the control logic is operable to concurrently write, at least sometimes, to the first PVRM element and to the second PVRM element.

24. An apparatus as in claim 20, wherein the capture element, the first passive variable resistance memory (PVRM) element, the second PVRM element and the control logic are integrated in an integrated circuit.

25. An apparatus as in claim 24, wherein the integrated circuit further comprises analog to digital converting logic operable to convert first analog information stored in the first PVRM element and second analog information stored in the second PVRM element to digital data.

26. An apparatus as in claim 20, wherein the control logic is operable to, before completing conversion of first analog information stored in the first PVRM element into digital data, begin writing second analog information to the second PVRM element.

27. An apparatus as in claim 20, wherein the control logic is operable to stop writing first analog information to the first PVRM element at a first exposure length to achieve a first exposure, and to stop writing second analog information to the second PVRM element at a second exposure length to achieve a second exposure different than the first exposure.

28. An apparatus as in claim 20, wherein the control logic is further operable to store the analog information in the first PVRM element and in the second PVRM element to provide redundancy buffering.

29. A non-transitory computer readable medium comprising executable instructions that when executed by an integrated circuit fabrication system, causes the integrated circuit fabrication system to produce an integrated circuit that comprises:
 a capture element operable to capture analog information;
 a first passive variable resistance memory (PVRM) element coupled to the capture element;
 a second PVRM element coupled to the capture element; and
 control logic operable to write at least portions of the analog information to the first PVRM element and to the second PVRM element, wherein the capture element is comprised by an imaging array configured to capture images, the first PVRM element and the second PVRM element are comprised by PVRM arrays coupled to the imaging array, and the control logic is further configured to:
 capture images at a capture rate with the imaging array;
 store the images in the PVRM arrays;
 select a first group of PVRM arrays from the PVRM arrays based on a first frame rate, the images stored in the first group of PVRM arrays being operable to produce a first image stream; and
 select a second group of PVRM arrays from the PVRM arrays based on a second frame rate which is faster than the first frame rate, the imagers stored in the second group of PVRM arrays being operable to produce a slow motion image stream.

30. A non-transitory computer readable medium as in claim 29, wherein the integrated circuit has a capture side and an opposite side opposite the capture side, and the first PVRM element is disposed between capture elements or intermediate the capture element and the opposite side.

31. A non-transitory computer readable medium as in claim 29, wherein the control logic is operable to concurrently write, at least sometimes, to the first PVRM element and to the second PVRM element.

32. A non-transitory computer readable medium as in claim 29, wherein the control logic is operable to, before completing conversion of first analog information stored in the first PVRM element into digital data, begin writing second analog information to the second PVRM element.

33. A non-transitory computer readable medium as in claim 29, wherein the control logic is operable to stop writing first analog information to the first PVRM element at a first exposure length to achieve a first exposure, and to stop writing second analog information to the second PVRM element at a second exposure length to achieve a second exposure different than the first exposure.

34. A non-transitory computer readable medium as in claim 29, wherein the control logic is further operable to store the analog information in the first PVRM element and in the second PVRM element to provide redundancy buffering.

35. A non-transitory computer readable medium as in claim 29, wherein the control logic is further operable to receive a control signal and select the second group of PVRM arrays after receiving the control signal.

36. A non-transitory computer readable medium as in claim 29, further comprising analog to digital converting logic operable to convert first analog information stored in the first PVRM element and second analog information stored in the second PVRM element to digital data.

* * * * *